US011137212B2

(12) United States Patent
Somhorst et al.

(10) Patent No.: US 11,137,212 B2
(45) Date of Patent: Oct. 5, 2021

(54) BYPASS SEAL FOR PLATE HEATER MATRIX

(71) Applicant: Hanon Systems, Daejeon (KR)

(72) Inventors: Leo Somhorst, Chislehurst (GB); Seok Jong Yoo, Daejeon (KR); Stephen Joyce, Redhill (GB); Kamil Stach, Hemel Hempstead (GB)

(73) Assignee: HANON SYSTEMS, Daejeon (KR)

( * ) Notice: Subject to any disclaimer, the term of this patent is extended or adjusted under 35 U.S.C. 154(b) by 539 days.

(21) Appl. No.: 15/190,527

(22) Filed: Jun. 23, 2016

(65) Prior Publication Data
US 2017/0370651 A1  Dec. 28, 2017

(51) Int. Cl.
  F28D 9/00  (2006.01)
  F02B 29/04  (2006.01)
  F28F 9/02  (2006.01)
  F28D 21/00  (2006.01)

(52) U.S. Cl.
  CPC ........ *F28D 9/0093* (2013.01); *F02B 29/0462* (2013.01); *F28D 9/0043* (2013.01); *F28F 9/02* (2013.01); *F28F 9/0219* (2013.01); *F28D 2021/0082* (2013.01); *F28F 2230/00* (2013.01); *F28F 2265/32* (2013.01); *F28F 2280/04* (2013.01); *Y02T 10/12* (2013.01)

(58) Field of Classification Search
  CPC ........ F28D 9/0093; F28D 9/02; F28D 9/0219; F28D 1/0233; F28D 1/05366; F28D 9/0056; F28F 1/045; F28F 3/025
  See application file for complete search history.

(56) References Cited

U.S. PATENT DOCUMENTS

| 7,004,237 | B2* | 2/2006 | Mathur | F28D 9/0006 165/167 |
| 8,651,092 | B2 | 2/2014 | Ghiani | |
| 9,175,596 | B2* | 11/2015 | Eilemann | F02B 29/0462 |
| 2005/0082049 | A1* | 4/2005 | Brost | F28D 9/005 165/166 |
| 2015/0068717 | A1* | 3/2015 | Gluck | B21D 53/04 165/166 |
| 2016/0097596 | A1* | 4/2016 | Stewart | F28D 1/0233 165/175 |

FOREIGN PATENT DOCUMENTS

| JP | S5770396 A | 4/1982 |
| JP | 08094274 A | 4/1996 |
(Continued)

*Primary Examiner* — Harry E Arant
(74) *Attorney, Agent, or Firm* — Shumaker, Loop & Kendrick, LLP; James D. Miller

(57) ABSTRACT

A heat exchanger for a motor vehicle includes a seal and a core. The core includes a first groove formed in a first side and a second groove formed in an opposing second side. The first groove and the second groove are each configured to receive a portion of the seal to secure the seal to the core. The seal includes a cross member and a pair of uprights extending from opposing ends of the cross member, wherein the cross member and the uprights each include a sealing element. The uprights further include a rail extending from the upright and configured to be received in the groove of the core. The core further includes an integrated shear panel formed at opposing ends thereof.

15 Claims, 8 Drawing Sheets

(56) References Cited

FOREIGN PATENT DOCUMENTS

| | | | |
|---|---|---|---|
| JP | 2005076802 | A | 3/2005 |
| JP | 2015535587 | A | 12/2015 |
| JP | 2016014475 | A | 1/2016 |
| KR | 20070019277 | | 2/2007 |
| KR | 20140075710 | A | 6/2014 |
| WO | 2015149949 | A1 | 10/2015 |

\* cited by examiner

BYPASS SEAL FOR PLATE HEATER MATRIX

FIELD OF THE INVENTION

The invention relates to a heat exchanger for a motor vehicle, and more particularly, to a core and seal for a heat exchanger.

BACKGROUND

Heat exchangers are commonly used in motor vehicles as a means of transferring thermal energy between fluids. A heat exchanger may include a core having a first fluid flow path and a second fluid flow path, wherein the first fluid flow path is fluidly separated, and in thermal communication with the second fluid flow path to facilitate a transfer of thermal energy therebetween. For example, the first fluid flow path may comprise a plurality of tubes or plates through which a first fluid flows, and second fluid flow path may comprise a matrix of passages which are formed intermediate to the tubes or plates of the first fluid flow path, wherein thermal energy is transferred through the walls of the tubes or plates from the first fluid to a second fluid.

For maximum efficiency, it is imperative to ensure that an entirety of the second fluid is directed through the second fluid flow path. For a heat exchanger, if the second fluid does not go through the second fluid flow path, but bypasses the matrix, this has a negative effect on the overall thermal performance of the heat exchanger. The loss in performance is approximately proportional to the amount of the second fluid bypassing the second fluid flow path. For water cooled charge air coolers, where the efficiencies range from 80-95% and the charge air is desired to be cooled down close to an ambient temperature this is a significant issue.

Commonly, seals are disposed in the heat exchanger, around exterior surfaces of the core, to prevent the second fluid flow from bypassing the core as it flows through the heat exchanger. These seals are often attached using an adhesive means or independent fasteners. However this configuration is problematic, as independent fasteners increase complexity, and adhesives used to fix the seals to the heat exchanger are often sensitive to various chemicals used in and around the heat exchanger, leading the adhesive to deteriorate over time. As the adhesive deteriorates, the seal may detach from the heat exchanger, and air may be allowed to bypass the second fluid flow path.

In addition to heat transfer performance, robustness of the heat exchanger is critical. In heat exchangers having a plate core, the core is formed of a plurality of adjacently stacked plates. Plate cores are typically susceptible to failure due to relative shear forces between adjacently stacked plates causing the plates to separate. To minimize relative shear forces within the core, shear panels are commonly attached or clamped to sides of the core to provide bracing. However, the shear panels are separately formed, and must be coupled or clamped to the core using independent coupling means, thereby increasing the complexity of the assembly.

Accordingly, there exists a need in the art for an improved and simplified core for a heat exchanger, the core having integrated means for coupling a seal and minimizing relative shear forces.

SUMMARY OF THE INVENTION

In concordance with the instant disclosure, an improved and simplified core for a heat exchanger, the core having integrated means for coupling a seal and minimizing relative shear forces is surprisingly discovered.

In a first embodiment a heat exchanger for a motor vehicle includes a seal and a core. The core includes a first groove formed in a first side and a second groove formed in an opposing second side. The first groove and the second groove are each configured to receive a portion of the seal to secure the seal to the core. The seal includes a cross member and a pair of uprights extending from opposing ends of the cross member, wherein the cross member and the uprights each include a sealing element. The uprights further include a rail extending from the upright, and configured to be received in the groove of the core.

In another embodiment, a core for a heat exchanger comprises a plurality of plates stacked in series. Each of the plates is formed of a pair of opposing panels having a flange formed at a first end thereof. The flange includes a planar interior land and a planar exterior land. The interior land and the exterior land are formed parallel to and spaced apart from each other, wherein the interior lands of adjacent panels abut each other when a pair of the panels is assembled. The exterior lands of adjacent panels are configured to abut each other when the assembled plates are adjacently stacked in the core.

In yet another embodiment, a seal for a heat exchanger is disclosed. The seal includes a cross member and a pair of uprights extending from opposing ends of the cross member. The cross member and the uprights include a sealing element having an arcuate cross section. The sealing member includes a pair of tapered wings. The uprights of the seal further include a rail extending inwardly from the sealing element. The rail includes a head portion and a neck portion, wherein the neck portion is formed intermediate the head portion and the sealing element. The rail is configured to be received in a groove formed in a core of a heat exchanger.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-7 show a heat exchanger 2 for a motor vehicle according the instant disclosure. The heat exchanger 2 comprises a header, a core 6, a seal 8, and a support. The heat exchanger 2 also includes a housing coupled to the header and configured to enclose the core 6, the seal 8, and the support structure when the heat exchanger 2 is assembled. However, the housing has been removed in the figures for the sake of clearly illustrating the internal configuration of the heat exchanger 2 including the core 6, the seal 8, and the support.

Figure 8:
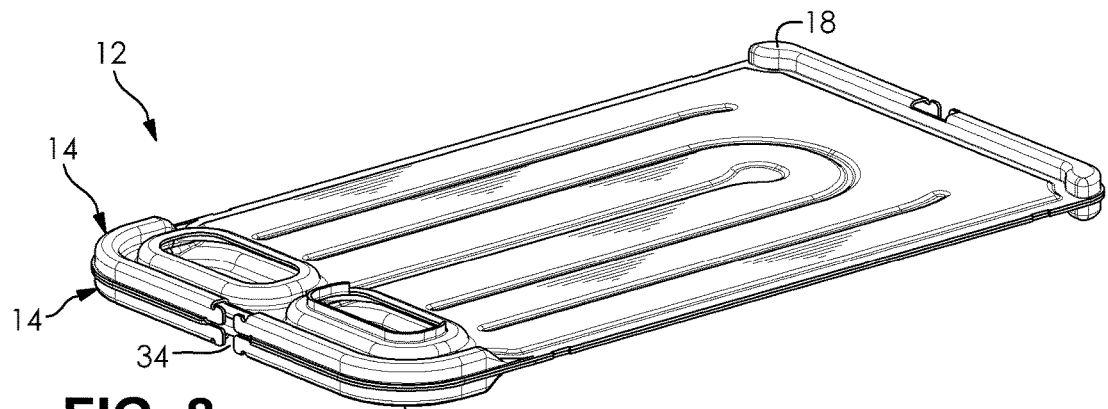
FIG. 8 is a perspective view of a plate of the instant disclosure.
Figure 9:
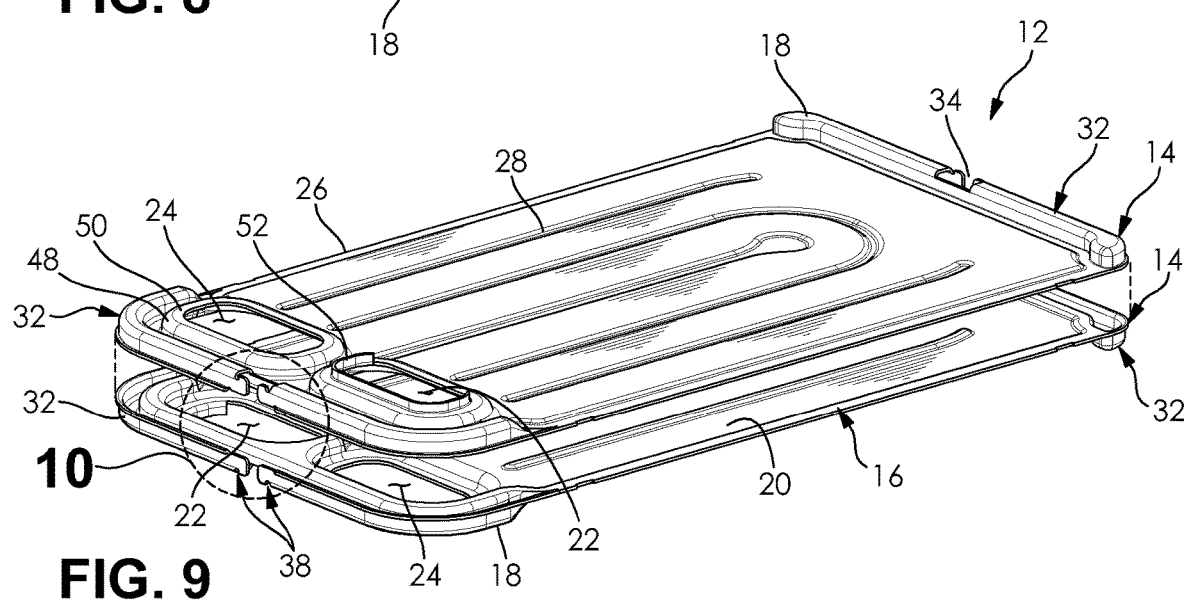
FIG. 9 is an exploded perspective view of the plate of FIG. 8.
Figure 10:
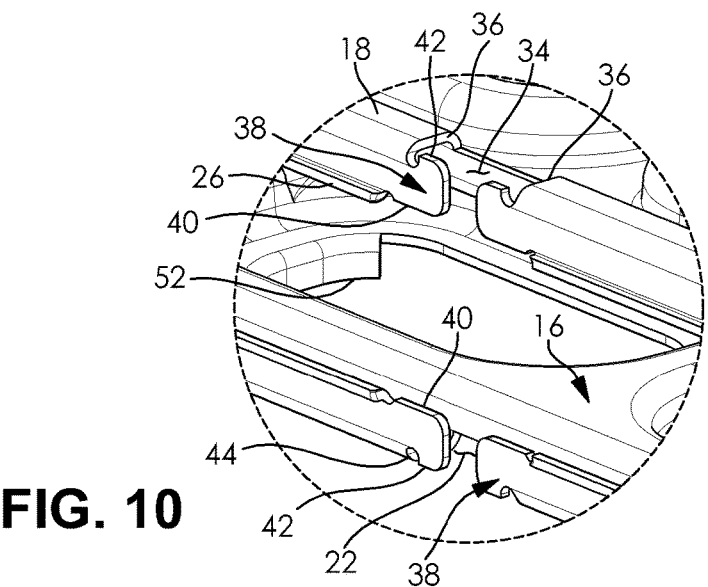
FIG. 10 is an enlarged fragmentary exploded perspective view of the plate of FIG. 8, taken at area 10 of FIG. 9.

In the illustrated embodiment, the core 6 of the heat exchanger 2 is formed of a plurality of plates 12 stacked in series. Referring to FIGS. 8-10, each of the plates 12 of the core 6 is formed of a pair of opposing panels 14. As shown, each of the panels 14 is identically formed, wherein when the panels 14 are assembled, the opposing sides of the plate 12 are reverse mirror images of each other.

Each of the panels 14 includes an interior land 16, an exterior land 18, a channel 20, an upstream aperture 22, and a downstream aperture 24.

The interior land 16 of the panel 14 is a substantially planar surface forming a first face of the panel 14. The interior land 16 includes a rim 26 circumscribing a perimeter of the panel 14, wherein the rim 26 is configured to abut the rim 26 of an opposing panel 14 when the plate 12 is assembled, to sealingly enclose the channels 20 of the opposing panels 14. The interior land 16 may further include a plurality of ribs 28 formed within the channel 20, and configured to divide the channels 20 into multiple flow paths when the panels 14 are assembled to each other.

The exterior land 18 of the panel 14 is a substantially planar surface forming a second face of the panel 14 opposite the first face formed by the interior land 16. The exterior land 18 is parallel to and spaced from the interior land 16, wherein a distance between the interior land 16 and the exterior land 18 defines a thickness of the panel 14.

In the illustrated embodiment, it will be understood that the interior land 16 is disposed in an interior of the plate 12 when opposing panels 14 are assembled to each other, wherein the interior lands 16 of the assembled panels 14 abut each other. Similarly, it will be appreciated that the exterior lands 18 are disposed on an exterior of the plate 12 when the panels 14 are assembled to each other, wherein the exterior lands 18 of adjacent plates 12 contact each other when the plates 12 are stacked, as shown in FIGS. 1-7.

The channel 20 is recessed from the interior land 16 of the main body, and fluidly connects the upstream aperture 22 to the downstream aperture 24. As provided above, the channel 20 may be divided into a plurality of flow paths by the ribs 28 of the interior land 16 of the panel 14.

Figure 4:
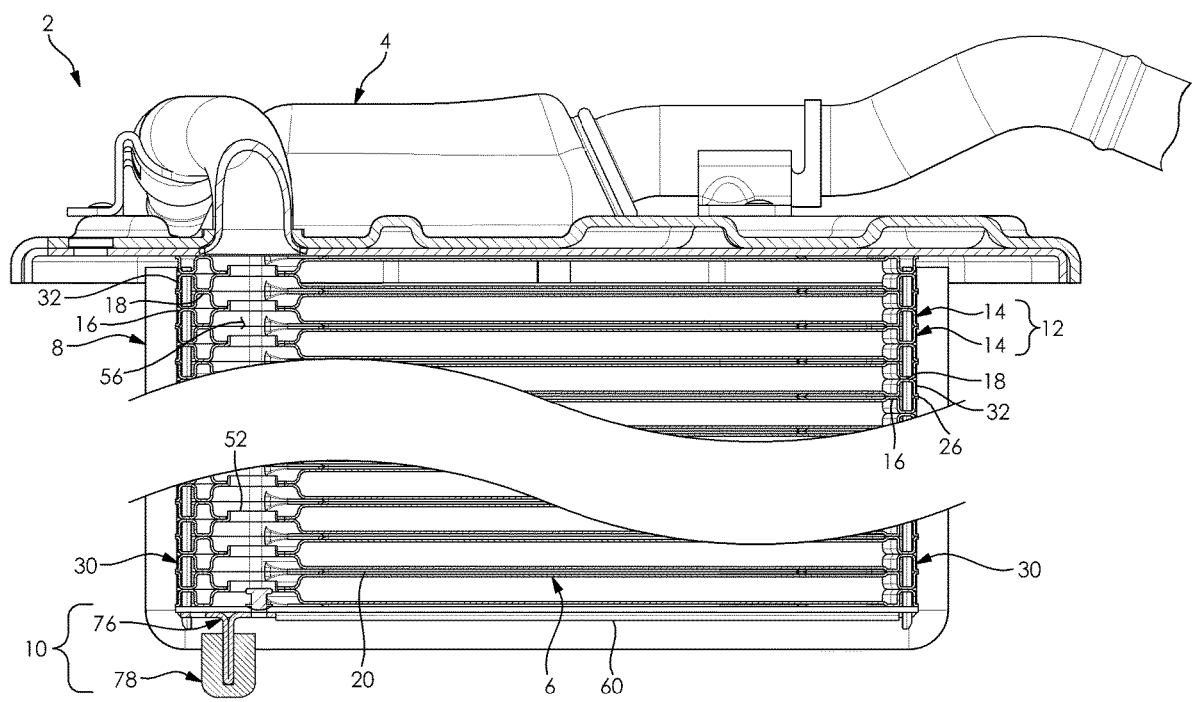
FIG. 4 is a fragmentary schematic cross-sectional elevation view of the assembly of FIG. 1, wherein the cross-section is taken through the an inlet manifold and an outlet manifold of the core, along the X-Z plane as defined in FIG. 1.
Figure 5:
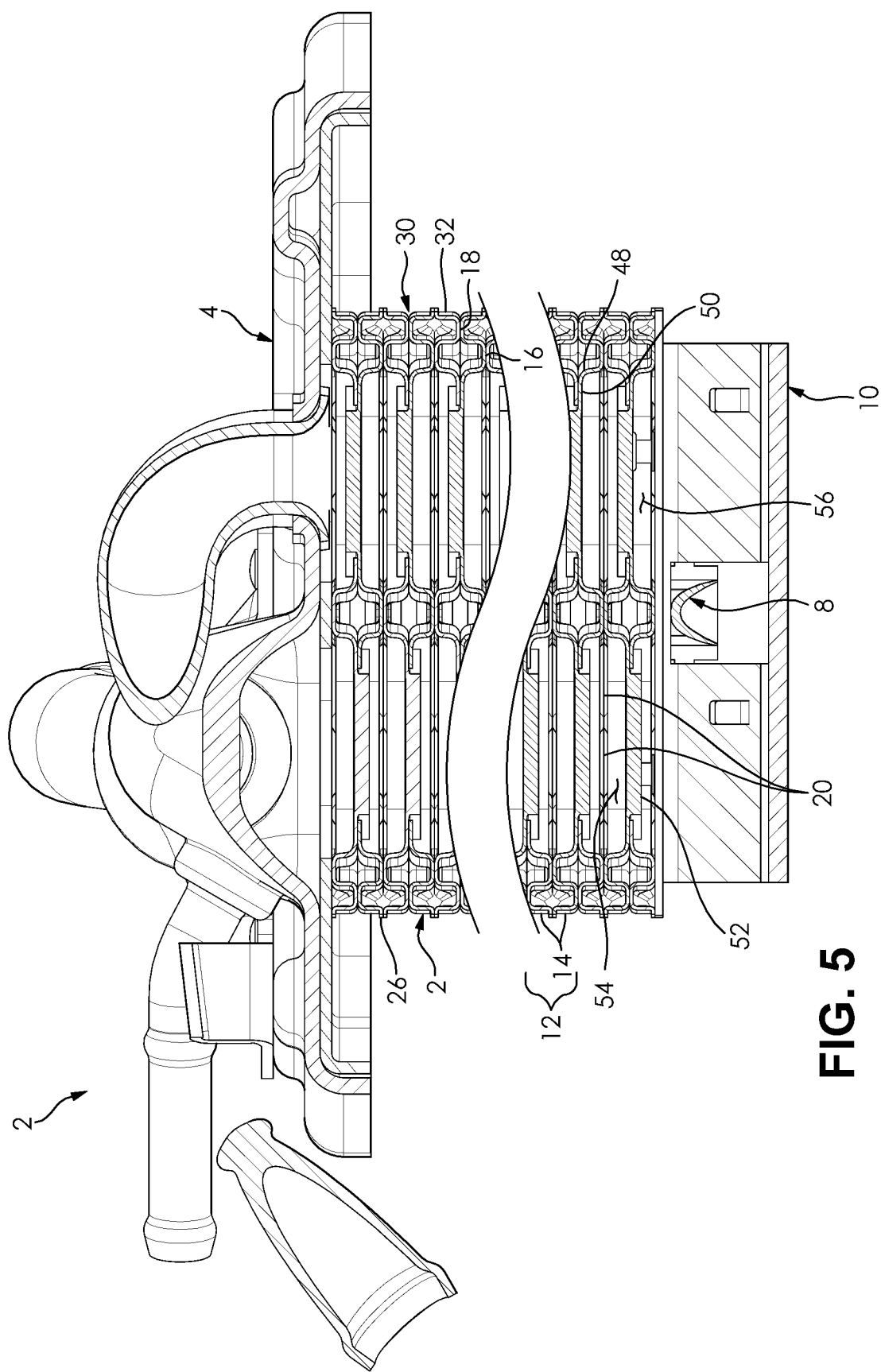
FIG. 5 is a fragmentary schematic cross-sectional elevation view of the assembly of FIG. 1, wherein the cross-section is taken through the outlet manifold of the core, along the Y-Z plane as defined in FIG. 1.

A flange 30 is formed at each end of the panel 14. Each of the flanges 30 includes the interior land 16, the exterior land 18, and an outer wall 32. In the illustrated embodiment, the interior land 16 of the flange 30 is formed inwardly from the exterior land 18 of the flange 30 with respect to the perimeter of the main body of the panel 14. However, it will be appreciated that in alternate embodiments, the exterior land 18 of the flange 30 may be formed inwardly from the interior flange 30 with respect to the perimeter of the main body. The flange 30 may also incorporate the rim 26 of the interior land 16 formed outwardly of the exterior land 18, wherein the flange 30 is arranged in an alternating order of interior land 16—exterior land 18—interior land 16. As shown in FIGS. 4 and 5, this configuration of the flange 30 forms a honeycombed pattern when the flanges 30 of the panels 14 are assembled.

The honeycombed pattern is beneficial in the assembly of the core 6, and improves robustness by forming integrated shear panels 14 at each end of the core 6. That is, when the panels 14 are assembled to each other, the interior lands 16 of adjacent panels 14 are coupled to each other and configured to militate against lateral shear between the panels 14. In one embodiment, the interior lands 16 of the panels 14 are joined to each other by mechanical means, such as welding or brazing. In alternate embodiments, the interior lands 16 may be joined chemically using an adhesive means. Similarly, when the plates 12 are assembled to each other to form the core 6, the exterior lands 18 of adjacent plates 12 are coupled to each other to form a second integrated shear panel 14 configured to militate against lateral shear between the plates 12. The exterior lands 18 may be joined mechanically or chemically, similar to the interior lands 16. Accordingly, the flanges 30 of the panels 14 serve to militate against lateral shear within the core 6, thereby maintaining relative alignment between adjacent plates 12.

Referring now to FIG. 10, the flange 30 further includes a recess 34 formed therein. As shown, the recess 34 is formed intermediate opposing terminal ends 36 of the flange 30, and particularly, intermediate terminal ends 36 of the exterior land and the outer wall 32. As shown, the recess 34 includes a substantially rectangular aperture formed through the exterior land 18 of the flange 30.

The recess 34 further includes a pair of converging tabs 38 extending into the recess 34 from the opposing terminal portions of the outer wall 32 of the flange 30. The tabs 38 are substantially planar and are continuously formed with the outer wall 32 of the flange 30. A height of each of the tabs 38 is less than the thickness of the panel 14, wherein an interior edge 40 of the tab 38 is spaced inward from the interior land 16 and an exterior edge 42 of the tab 38 is spaced inward from the exterior land 18. Accordingly, when the core 6 is assembled gaps are formed intermediate adjacently stacked tabs 38, wherein each of the tabs 38 can be bent freely. Each of the tabs 38 further includes a relief or an indentation 44 formed in the exterior edge 42, adjacent the respective terminal end 36 of the flange 30. In alternate embodiments, the tab 38 may also include at least one of a relief 44 formed in the interior edge 40, a perforation formed through the tab 38, or other features configured to aide in assembly of the heat exchanger 2.

Figure 1:
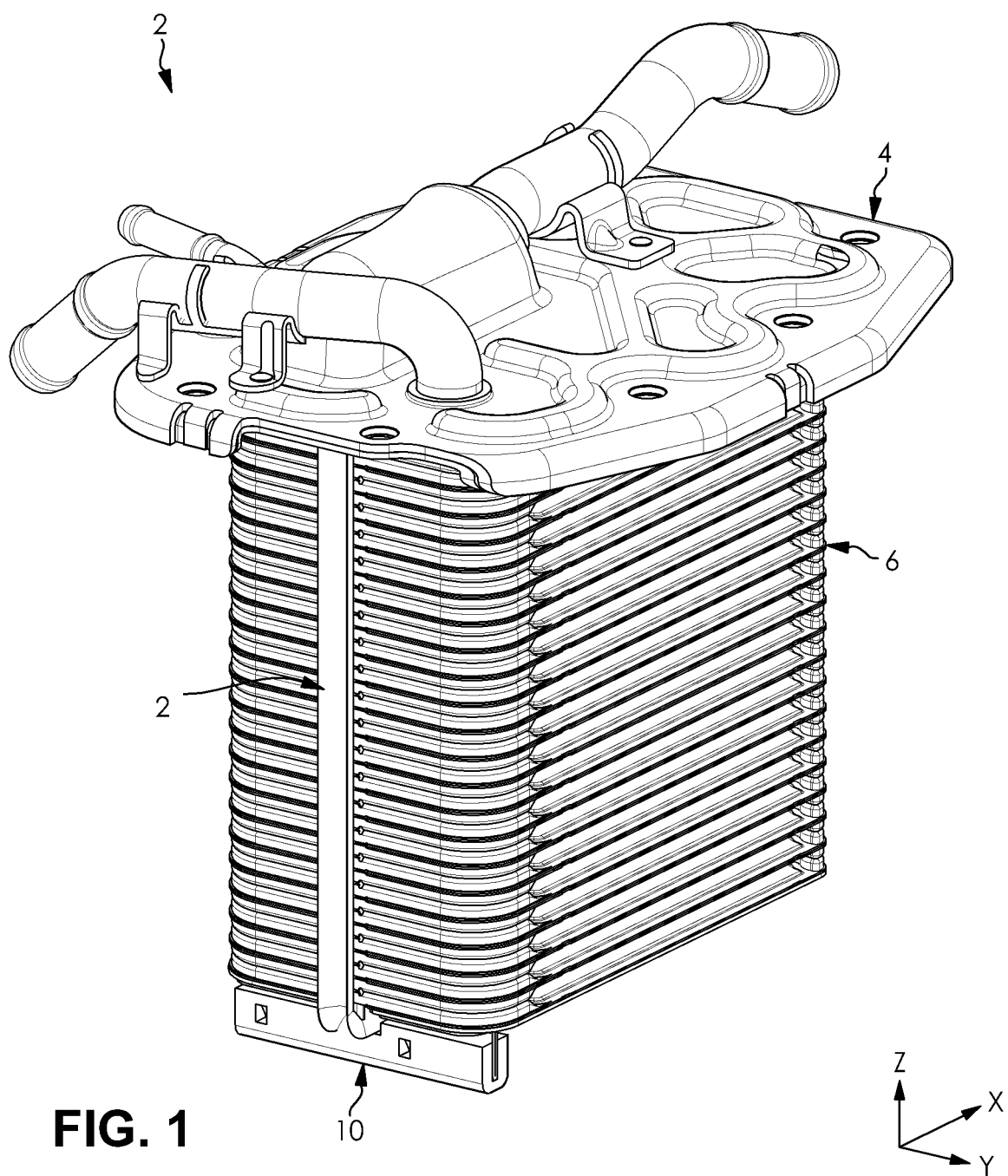
FIG. 1 is a top perspective view of a heat exchanger of the instant disclosure.
Figure 2:
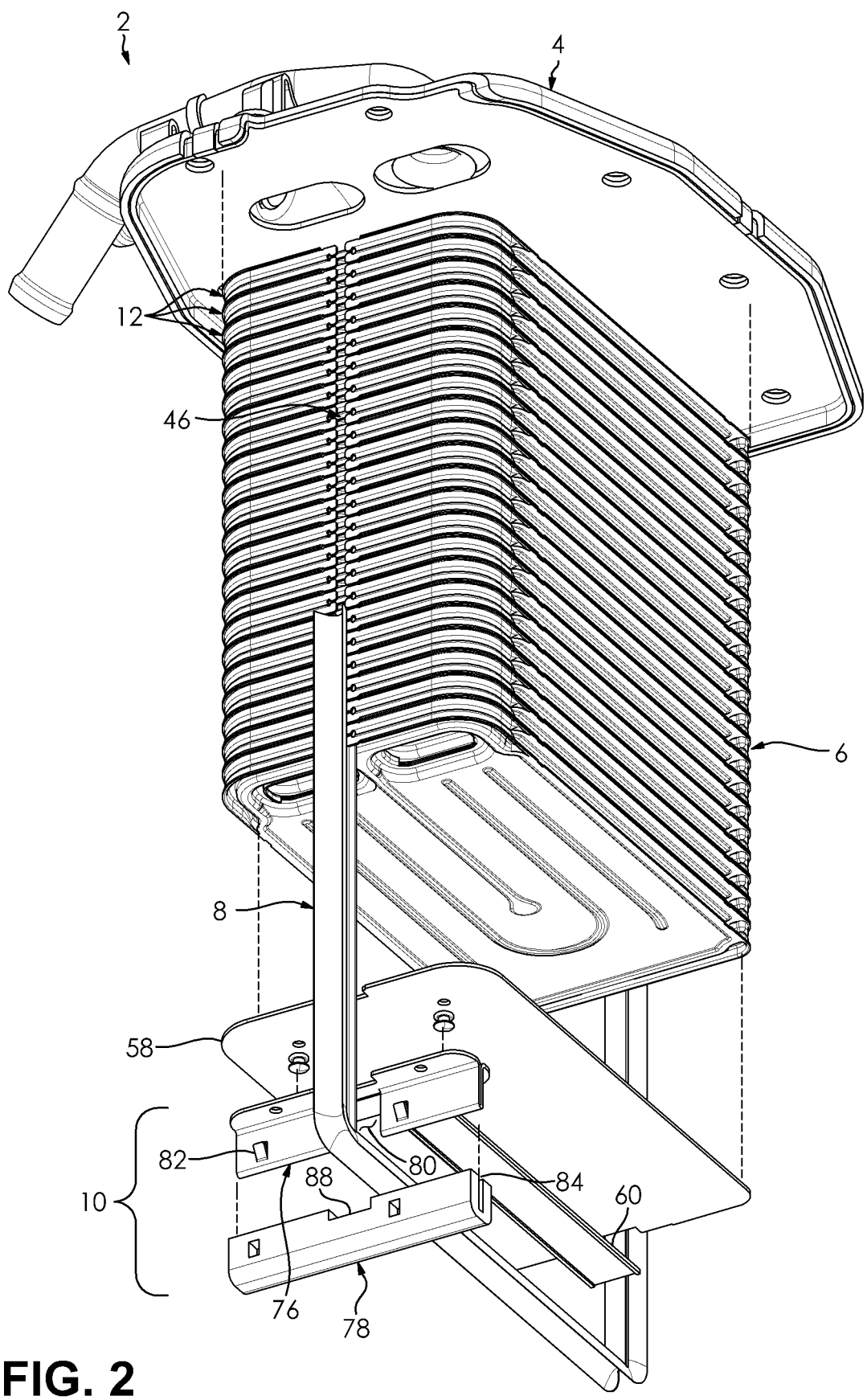
FIG. 2 is a partially exploded bottom perspective view of the assembly of FIG. 1.
Figure 3:
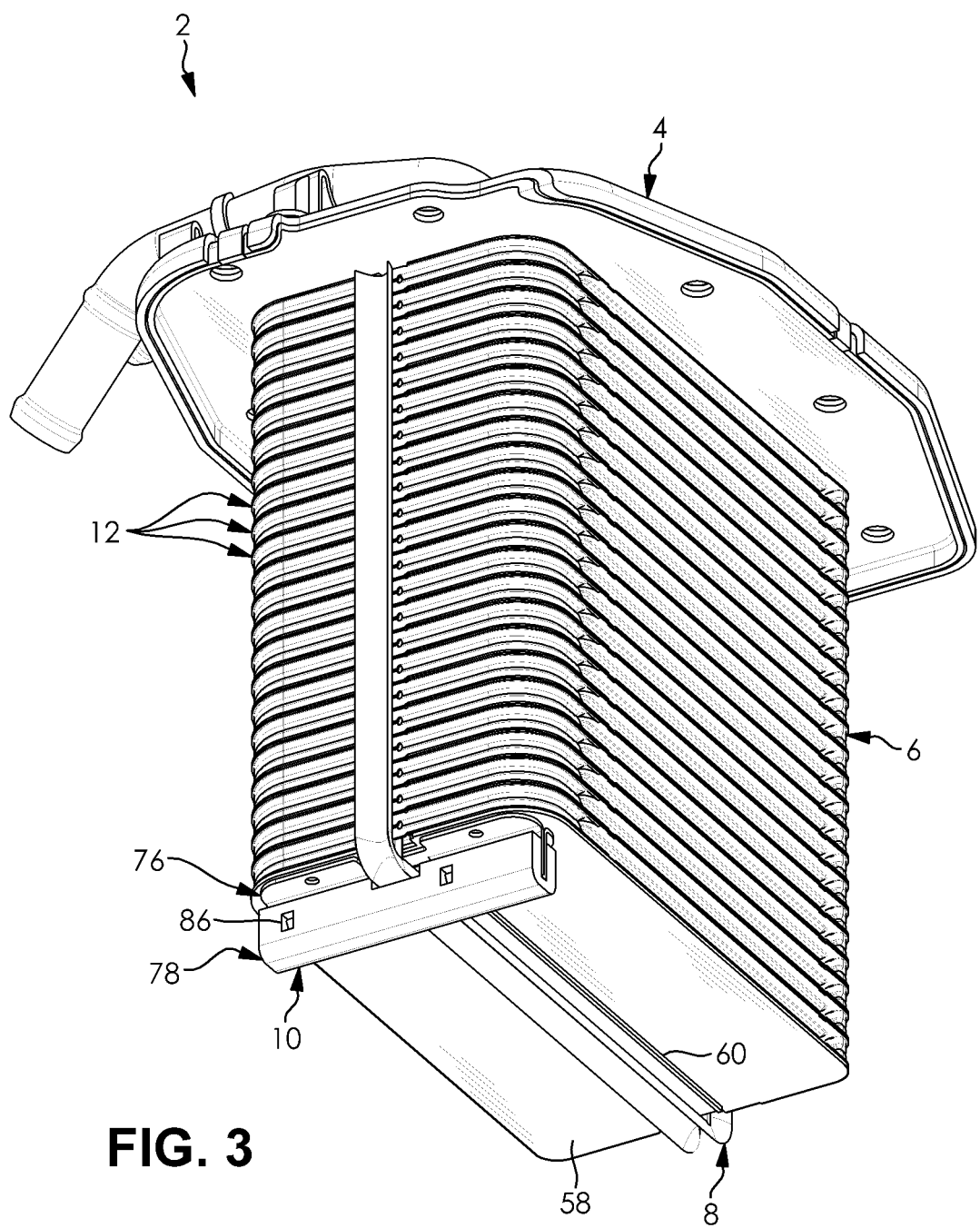
FIG. 3 is a bottom perspective view of the assembly of FIG. 1.
Figure 6:
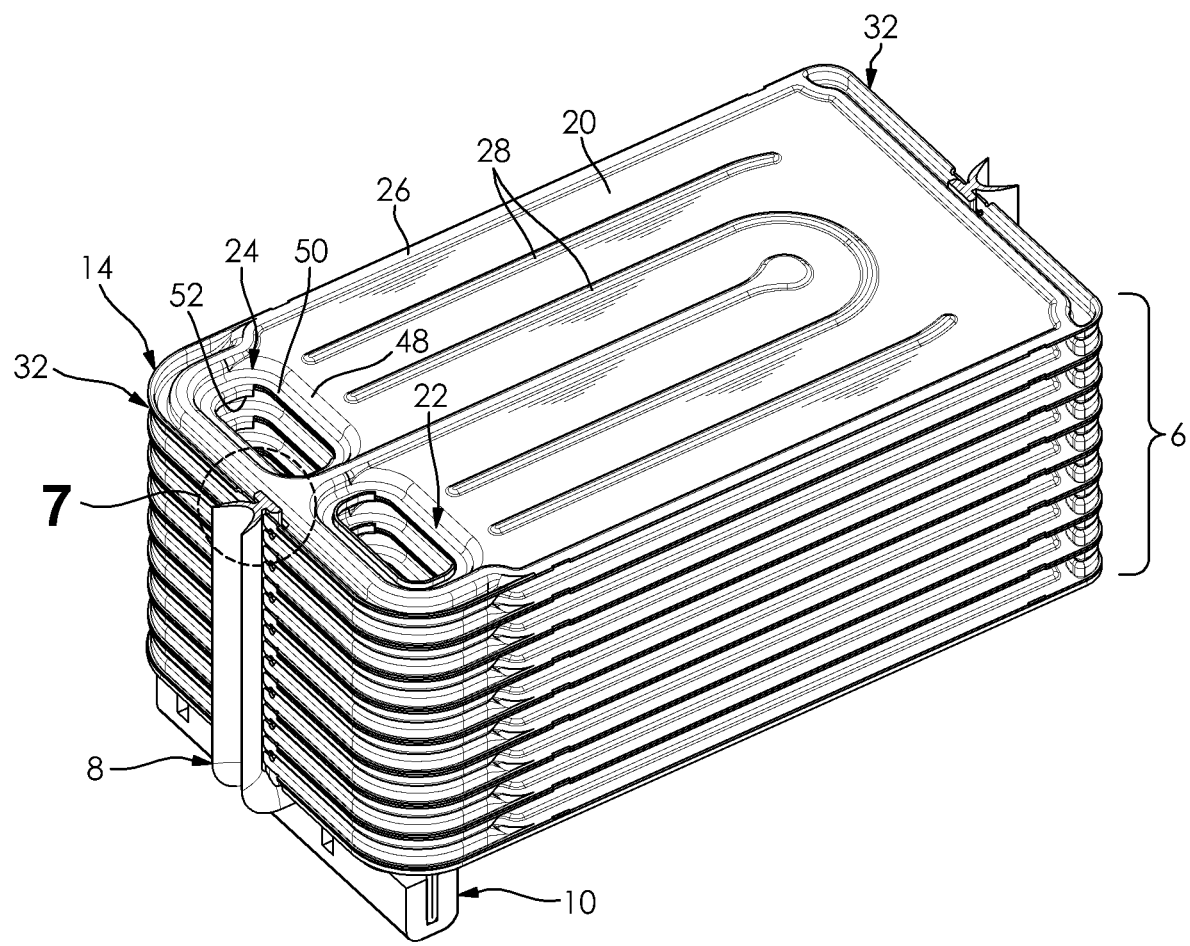
FIG. 6 is a top-perspective cross-sectional view of the assembly of FIG. 1, wherein the cross section is taken through a plate of the core, along the X-Y plane as defined in FIG. 1.
Figure 7:
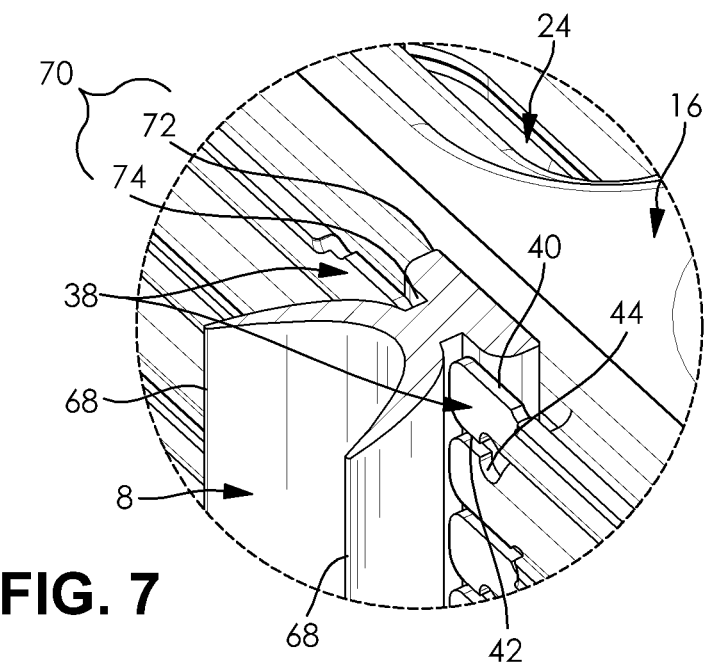
FIG. 7 is an enlarged fragmentary cross-section view of the assembly of FIG. 1, taken at area 7 of FIG. 6.

As shown in FIGS. 2, 6, and 7, when the assembled plates 12 are stacked to form the core 6, the recesses 34 of adjacently stacked plates 12 are aligned to form a continuous groove 46 configured to receive a portion of the seal 8 therein. In the illustrated embodiment, each of the flanges 30 includes a single recess 34 centrally disposed thereon, wherein a single groove 46 is formed in each opposing end of the core 6. In alternate embodiments each flange 30 may include a plurality of recesses 34 formed thereon, and the recesses 34 may be symmetrically or asymmetrically spaced along the flange 30 to form a plurality of grooves 46 on each end of the core 6.

In the illustrated embodiment, each of the upstream aperture 22 and the downstream aperture 24 are formed side-by-side, adjacent a first end of the panel 14. The upstream aperture 22 and the downstream aperture 24 each include a shoulder 48 formed therein, wherein the shoulder 48 includes a planar land 50 extending radially inwardly from a perimeter of the aperture. The planar land 50 of the aperture is coplanar with the exterior land 18 of the main body and abuts a planar land 50 of a corresponding plate 12 when the core 6 is assembled. The downstream aperture 24 further includes a lip 52 formed thereon. In the illustrated embodiment, the lip 52 extends away from the planar land 50 in an axial direction, and partially circumscribes a portion of the shoulder 48 adjacent the end of the panel 14. The lip 52 of the downstream aperture 24 is configured to be received though the upstream aperture 22, wherein the flange 30 cooperates with an interior of the upstream aperture 22 to align adjacently stacked plates 12. By forming the lip 52 only partially around an outward portion of the downstream aperture 24, a flow of fluid from the downstream aperture 24 into the channels 20 is unobstructed by the lip 52. Accordingly, the lip 52 beneficially provides alignment between adjacently stacked plates 12 without detriment to the performance of the heat exchanger 2.

When the plates 12 are stacked, the upstream apertures 22 and the downstream apertures 24 form an inlet manifold 54 and an outlet manifold 56, as shown in FIG. 5. The inlet manifold 54 is in fluid communication with the outlet manifold 56 through the plurality of the enclosed channels 20, thereby forming a first fluid flow path of the core 6. A second fluid flow path is formed external to the core 6, wherein a second fluid passes through a matrix of channels 20 formed intermediate adjacent ones of the plates 12.

The core 6 further includes an end plate 58 fixed to a bottom most one of the panels 14 and configured to sealingly enclose the first fluid flow path. The end plate 58 may be sealingly joined to the interior land 16 of the bottom most panel 14 using a mechanical or chemical coupling means. The end plate 58 may include a guide 60 formed thereon, wherein the guide 60 is configured to abut and align a portion of the seal 8 when the seal 8 is installed in the core 6.

Figure 11:
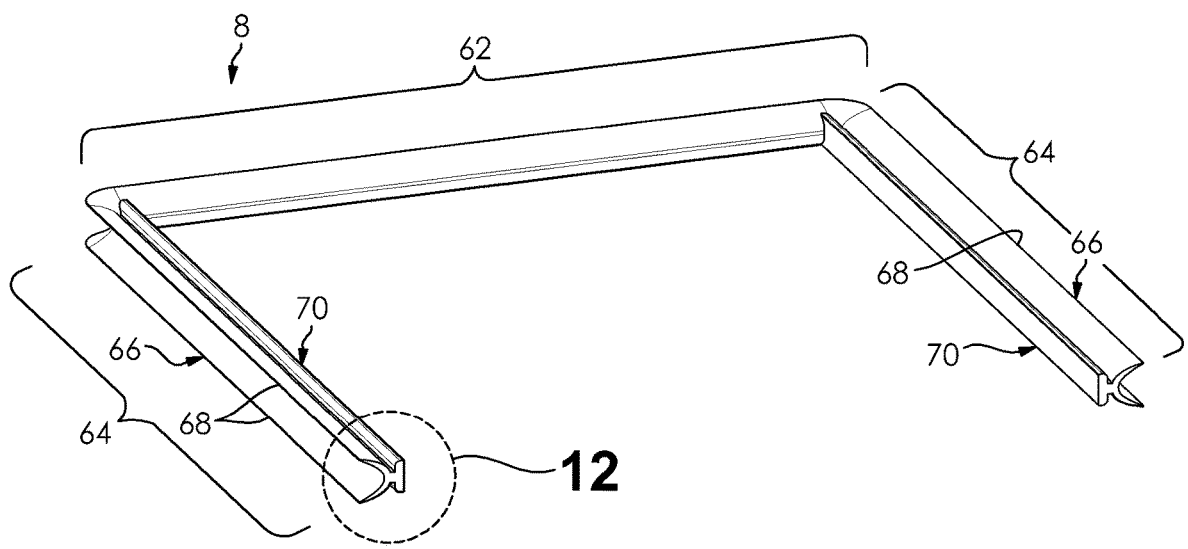
FIG. 11 is a perspective view of a seal of the instant disclosure.
Figure 12:
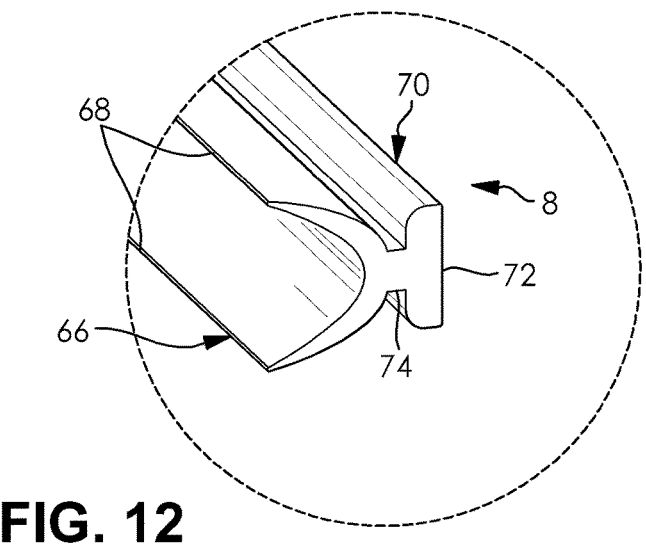
FIG. 12 is an enlarged fragmentary perspective view of the seal of FIG. 11, taken at area 12 of FIG. 11.

Referring to FIGS. 11 and 12, the seal 8 includes a cross-member and pair of uprights 64 extending from opposing ends of the cross member 62. Each of the cross member 62 and the uprights 64 includes a sealing element 66 formed of a substantially elongate body having an arcuate cross section, wherein the arcuate cross section forms a pair of outwardly extending wings 68. As shown, the arcuate cross section of the seal 8 is tapered, wherein a thickness of the wings 68 decreases towards a tip of each of the wings 68. The tapered configuration advantageously maximizes the pliability of the tips to allow the tips of the seal 8 to accommodate irregularities formed in a corresponding sealing surface (not shown) of the housing. The tapered configuration further functions to increase rigidity of the wings 68 as a distance from the tip increases, thereby providing sufficient sealing force between the wings 68 and the sealing surface of the housing when the heat exchanger 2 is assembled.

The seal 8 further includes an elongate rail 70 extending from a convex side of the sealing member, opposite the wings 68. The rail 70 includes a head portion 72 and a neck portion 74. The head portion 72 is configured to be received through the recesses 34 of the panels 14. In the illustrated embodiment, the head portion 72 has as substantially rectangular cross section and may include radiused edges formed adjacent to the neck portion 74. In alternate embodiments the head portion 72 may have other cross-sectional shapes, such as round, ovular, or polygonal. The neck portion 74 is formed intermediate the sealing element 66 and the head portion 72 and is configured to be received between the converging tabs 38 of each of the panels 14.

Although the uprights 64 of the illustrated seal 8 are distinctly formed from the cross member 62, it will be appreciated that the seal 8 may be continuously formed, wherein cross member 62 and the uprights 64 each include the sealing element 66 and the rail 70. In the alternate embodiment, the seal 8 may be extruded, wherein the sealing element 66 and the rail 70 extend along an entirety of the seal 8. Notches may be formed in the rail 70, thereby allowing the seal 8 to be bent, forming corners intermediate the cross-member 62 and the uprights 64. Accordingly, in the alternate embodiment, the rail 70 would extend along each of the uprights 64 and the cross member 62.

When the seal 8 is assembled to the core 6, the head portion 72 is received in the substantially rectangular aperture formed in the exterior land 18 of the flange 30, and neck portion 74 is disposed intermediate the converging tabs 38, wherein the converging tabs 38 are positioned intermediate the head portion 72 and the sealing element 66 and function to retain the head portion 72 within the recess 34.

The seal 8 is formed of a pliable material and is configured to provide a fluid seal 8 between the core 6 and the housing. In one embodiment, the seal 8 may be homogenously formed of a single polymeric material, such as a fluoroelastomer (FKM) rubber or an ethylene propylene diene monomer (EPDM) rubber. In alternate embodiments, the seal 8 may be formed of a composite, wherein the sealing element 66 is formed of a first pliable material configured for sealing and the rail 70 is formed of a second pliable material configured to aide in insertion of the rail 70 through the groove 46 of the core 6, wherein the second pliable material is more rigid than the first pliable material. In yet another embodiment, the rail 70 may be formed of a rigid material.

As shown in FIGS. 1-6, the support of the heat exchanger 2 includes a leg 76 and a damper 78. The leg 76 of the support is coupled to the base plate of the core 6, intermediate the first end of the core 6 and a terminal end of the guide 60. In alternate embodiments, the leg 76 may be disposed in other areas of the base plate. The leg 76 is a substantially planar plate extending downward from the base plate, and includes a gap 80 formed therein. The gap 80 is configured to receive the cross member 62 of the seal 8 therethrough when the seal 8 is assembled to the heat exchanger 2. The leg 76 may include a plurality of wedge-shaped protuberances 82 formed thereon, wherein the protuberances 82 are taper inwardly toward a lower portion of the leg 76. The leg 76 may be formed of a rigid material, such as a metal or plastic.

The damper 78 is formed of a resilient material, such as a rubber or foam, and may be configured to receive the leg 76 therein. In the illustrated embodiment, the damper 78 includes a channel 84 configured to receive the leg 76 therein, wherein the damper 78 substantially encompasses the leg 76. The damper 78 may include a plurality of detents 86 configured to cooperate with the tapered protuberances 82 of the leg 76 to secure the damper 78 thereto. The damper 78 further includes a recess 88 formed in an upper portion thereof. The recess 88 is configured to receive a portion cross member 62 of the seal 8 therethrough when the damper 78 is assembled to the leg 76, wherein the cross member 62 is restrained between the gap 80 of the leg 76 and the recess 88 of the damper 78.

During assembly of the heat exchanger 2 the core 6 is assembled by adjacently stacking a plurality of the plates 12. As described hereinabove, the flanges 30 of the adjacently stacked plates 12 form an integrated shear panel 14 and a groove 46 on each end of the core 6. With the core 6 assembled, distal ends of the uprights 64 are positioned wherein the head portion 72 of the rail 70 is inserted into the groove 46 from the bottom of the plate. The head portion 72 is progressed through the grooves 46 until the cross member 62 abuts the guide 60 and is received in the gap 80 of the leg 76.

To secure seal 8 to the core 6, the tabs 38 of the recesses 34 may be bent inward to compress the head portion 72 within the groove 46. In one embodiment, the tabs 38 may be manually bent inward after the seal 8 is installed. In an alternate embodiment, a spring force may cause the tabs 38 to bend inward automatically, wherein a leading edge of the head portion 72 is used to advance the head portion 72 past the tabs 38. To secure the cross member 62 to the core 6, the damper 78 is installed over the leg 76, wherein the recess 88 of the damper 78 retains the seal 8 against the leg 76 and the guide 60. Additionally, adhesives may be used to supplement the integral installation features of the core 6.

From the foregoing description, one ordinarily skilled in the art can easily ascertain the essential characteristics of this invention and, without departing from the spirit and scope thereof, can make various changes and modifications to the invention to adapt it to various usages and conditions.

The invention claimed is:

1. A heat exchanger for a motor vehicle comprising:
   a core having a plurality of plates adjacently stacked, each of the plates having a flange formed at a first end thereof and a recess formed in the flange, wherein the recesses of the plates cooperate with each other to form a continuous first groove along a first side of the core, wherein the flange includes a pair of tabs integrally formed with the flange, and wherein the pair of tabs converge towards each other and continuously extend from an outer wall of the flange inwardly into the recess; and
   a seal having a rail, wherein the first groove is configured to receive the rail of the seal therein.

2. The heat exchanger of claim 1, wherein the seal includes a cross member and a pair of uprights extending from opposing ends of the cross member, one of the uprights configured to be received by the first groove of the core.

3. The heat exchanger of claim 2, wherein the cross member and the uprights of the seal each include a sealing element, and the rail extends from the sealing element and is configured to be received in one of the first groove and a second groove formed in a second side of the core.

4. The heat exchanger of claim 2, wherein each of the plates is formed of a pair of opposing panels, wherein at least one of the pair of opposing panels has the flange formed at a first end thereof, the flange including a planar interior land and a planar exterior land, the interior land and the exterior land formed parallel to and spaced apart from each other, wherein the interior lands of the panels of each of the plates abut each other when the pair of panels is assembled, and wherein the exterior lands of the panels of each of the plates abut the exterior land of one of the panels of adjacent ones of the plates when the assembled plates are stacked.

5. The heat exchanger of claim 4, wherein the interior land of the flange includes a first portion formed inwardly of the exterior land of the flange with respect to a perimeter of the flange, and a rim formed outwardly of the exterior land with respect to the perimeter of the flange.

6. The heat exchanger of claim 1, wherein the tabs extend into the recess from opposing terminal ends of the outer wall of the flange, the tabs configured to retain the rail of the seal within the first groove of the core.

7. The heat exchanger of claim 1, wherein the tabs bend inwardly towards the core and compress a portion of the rail within the groove.

8. The heat exchanger of claim 7, wherein the tabs bend inwardly towards the core with a spring force.

9. The heat exchanger of claim 7, wherein the rail includes a head portion and a tail portion, the head portion received in the groove directly between the flange and each of the tabs.

10. A core for a heat exchanger comprising a plurality of adjacently stacked plates, each of the plates formed of a pair of opposing panels having a flange formed at a first end thereof, the flange including a planar interior land and a planar exterior land, the interior land and the exterior land formed parallel to and spaced apart from each other, wherein the interior lands of the panels of each of the plates abut each other when the pair of panels is assembled, and wherein the exterior lands of the panels of each of the plates abut the exterior land of one of the panels of adjacent ones of the plates when the assembled plates are stacked, wherein a recess is formed in the flange, wherein the recesses of the panels cooperate with each other to form a continuous first groove along a first side of the core, and wherein a pair of tabs converge towards each other and extend from an outer wall of the flange inwardly into the recess.

11. The core of claim 10, wherein a portion of the interior land of the flange is divided into a first interior land formed inwardly of the exterior land with respect to a perimeter of the panel and a second interior land formed outwardly of the exterior land with respect to the perimeter of the panel.

12. The core of claim 11, wherein each of the panels includes a second flange formed at a second end thereof opposing the first end thereof.

13. The core of claim 10, wherein each of the panels includes an upstream aperture and a downstream aperture, wherein the upstream aperture includes a lip extending axially therefrom, the lip partially circumscribing an inner perimeter of the upstream aperture.

14. The core of claim 10, wherein the tabs extend from opposing terminal portions of the outer wall of the flange.

15. The core of claim 10, wherein each of the tabs includes an indentation formed in an edge thereof.

* * * * *